(12) United States Patent
Alarie

(10) Patent No.: US 8,676,813 B2
(45) Date of Patent: Mar. 18, 2014

(54) METHOD AND SYSTEM FOR SELECTING A SUBSET OF INFORMATION TO COMMUNICATE TO OTHERS FROM A SET OF INFORMATION

(76) Inventor: Denis J. Alarie, Timmins (CA)

( * ) Notice: Subject to any disclaimer, the term of this patent is extended or adjusted under 35 U.S.C. 154(b) by 78 days.

(21) Appl. No.: 13/232,558

(22) Filed: Sep. 14, 2011

(65) Prior Publication Data

US 2013/0066915 A1     Mar. 14, 2013

(30) Foreign Application Priority Data

Sep. 6, 2011 (CA) .................................. 2751795

(51) Int. Cl.
*G06F 17/30* (2006.01)
(52) U.S. Cl.
USPC .......................................... 707/748; 707/780
(58) Field of Classification Search
USPC ................................................ 707/748, 780
See application file for complete search history.

(56) References Cited

U.S. PATENT DOCUMENTS

| | | | |
|---|---|---|---|
| 5,456,473 A | 10/1995 | Whitney | |
| 6,148,330 A | 11/2000 | Puri et al. | |
| 6,516,340 B2 | 2/2003 | Boys | |
| 6,580,438 B1 | 6/2003 | Ichimura et al. | |
| 6,745,195 B1 | 6/2004 | Kornfein et al. | |
| 7,056,860 B2 * | 6/2006 | Tetrault | 503/201 |
| 7,155,399 B2 * | 12/2006 | Andre et al. | 705/7.14 |
| 7,246,316 B2 | 7/2007 | Furlong et al. | |
| 7,289,890 B2 * | 10/2007 | Mitchell et al. | 701/1 |
| 7,925,579 B1 * | 4/2011 | Flaxman et al. | 705/38 |
| 8,068,599 B2 * | 11/2011 | Sarin et al. | 379/265.09 |
| 8,489,498 B1 * | 7/2013 | Flaxman et al. | 705/38 |
| 2002/0198755 A1 | 12/2002 | Birkner et al. | |
| 2005/0197856 A1 | 9/2005 | Drucker | |
| 2005/0223314 A1 | 10/2005 | Varadarajan et al. | |
| 2009/0135007 A1 | 5/2009 | Donovan et al. | |
| 2011/0313802 A1 * | 12/2011 | Timothy et al. | 705/7.13 |

OTHER PUBLICATIONS

"Simply! Tracking(R) Track and Create Training Online", http://www.kccsoft.com/simplytracking.asp, KnowledgeWare Communications Corp.

* cited by examiner

*Primary Examiner* — Kim Nguyen
(74) *Attorney, Agent, or Firm* — Boyle Fredrickson, S.C.

(57) ABSTRACT

A method for selecting a subset of information to communicate to others from a set of information comprising a plurality of content items. In accordance with the method, the set of information is stored in a user retrievable format, a relative priority is assigned to each of the plurality of content items, and the subset of information is automatically generated by selecting a predetermined number of the plurality of content items from the set of information based on the relative priorities of each of the plurality of content items. The predetermined number is less than the number of said plurality of content items and the subset of information is a prioritized subset of the set of information. A system, and a computer readable medium carrying computer readable instructions for carrying out the method are also disclosed.

51 Claims, 7 Drawing Sheets

Legend:
X = Not Satisfactory
√ = Satisfactory
— = Not applicable, relevant or checked at this time Project Name: _____
Date: _____

| Item | Category | Description | Comments | Status | Priority |
|---|---|---|---|---|---|
| JR9 | Budget | Review Budget and Targets | *Reviewed allocated rates* | ✓ | 100 |
| JR37 | Control | Is the project manager organized and how does he organize his activities and the activities of those below him | | — | 10 |
| JR39 | Cost Control | Are cost calculations a part of management strategy on the site | *No understanding of cost shown - didn't know how much spent* | ⊗ | 1 |
| JR40 | Cost Control | Are cost objectives being met | | ⊗ | 1 |
| JR41 | Cost Control | Cost Cutting Measures on the Site | *None observed* | ⊗ | 1 |
| JR42 | Cost Control | Production Charts - Key items | | — | 1 |
| JR43 | Cost Control | Purchase order procedures being followed | *POs done when invoice arrives* | ✓ | 1 |
| JR62 | Employee | Have employment procedures been followed | | — | 10 |
| JR65 | Equipment | # Fire extinguishers | *1 observed in site trailer* | ⊗ | 1 |
| JR168 | Independent operators | Check for a clearance certificate from WSIB | *No doc's for any supplies currently on site* | ⊗ | 1 |
| JR169 | Independent operators | Check for owner having WSIB optional insurance for themselves or have them sign a waiver | | ⊗ | 1 |
| JR182 | ISO | Ask to see New Vendor Evaluation forms (QD275) | *Not completed* | ⊗ | 1 |
| JR185 | ISO | Ask to see the Certificates of Insurance from one of the subcontractors (SOP036) | *Western Mechanical* | ✓ | 1 |
| JR191 | ISO | Has QD275 New Subcontractor/Supplier Prequalification assessment been completed? | *Duplicate* | — | 5 |
| JR204 | ISO | Verify that QD186 Purchase Order Log is being used for tracking purposes (SOP041) | *Yes, but not updated* | ⊗ | 1 |
| JR224 | Legal | Digital site photos are taken | Confirm that dates are correct on the cameras | — | 1 |
| JR231 | Misc | Anything to go from the warehouse or mail | *Nothing* | ✓ | 100 |
| JR242 | Office | Purchasing protocols being followed | *Duplicate* | — | 1 |

Comments - include any suggestions for improvement and/or any safety supplies that are needed on site

*See attached list of supplies currently on site. All highlighted items are missing required documentation.*

_____

_____

Project Manager Signature _____

Management Inspector Signature _Patricia_

Fig. 2

Legend:
X = Not Satisfactory
✓ = Satisfactory
— = Not applicable, relevant or checked at this time Project Name: _____
Date: _____

| Item | Category | Description | Comments | Status | Priority |
|---|---|---|---|---|---|
| S151 | Cal Toolbox Topics | Protecting the Public | http://safety.cal.com/cda/layout?m=133385&x=7 | ○ | 5 |
| S159 | Cal Toolbox Topics | Safety Around Conveyor Belts | http://safety.cal.com/cda/layout?m=133385&x=7 | ○ | 5 |
| S227 | CVOR | Insecure loads even in pickup trucks can result in incidents, charges and a record on our CVOR | Insecure loads affect our Commercial Vehicle Operators Registration (CVOR) | ○ | 5 |
| S229 | CVOR | Proof of TDG training and documentation for transported goods can avoid a record on CVOR | TDG Training and Documentation may affect our CVOR even when using pickups | ○ | 5 |
| S313 | Equipment | Repairs should be done as soon as possible to avoid related injury or damage | If something doesn't function correctly take the time to evaluate safety consequences | ○ | 5 |
| S368 | Equipment General | Avoid Personal Injury to hands and other parts of your body; stay alert for pinch points | Watch pinch points on equipment and between equipment and surrounding items | ○ | 5 |
| S382 | Equipment General | Know what the blind spots on your equipment are and make sure they are clear of obstacles | If unsure stop, wait, check to ensure there are no people or equipment in blind spots | ○ | 5 |
| S790 | Safety | Wear gloves to prevent injury when working with your hands in areas that have sharp edges | Consider wearing them at all times to avoid cuts or burns and to reduce impact forces | ○ | 5 |
| S868 | Training | Orientation Checklist Form |  | ○ | 5 |
| S922 | Workers | Know equipment limits to avoid injury when operating | Avoid neck, back, and shoulder injury by using seat belt and not bouncing around | ○ | 5 |

Supervisor x_____ x_____
Comments: _____

Employees in Attendance:
Name:        Signature:        Name:        Signature:

Fig. 3

Safety Prevention

Table of Contents

- Protecting the Public
- Safety Around Conveyor Belts
- Insecure loads even in pickup trucks can result in incidents, charges and a record on our CVOR
- Proof of TDG training and documentation for transported goods can avoid a record on CVOR
- Repairs should be done as soon as possible to avoid related injury or damage

Fig. 4

| | Item | Category | Description | Comments and References | Status | Priority |
|---|---|---|---|---|---|---|
| 11 | M_1 | Open pit | Meet with geologist | 1 | ○ | 1 |
| 12 | M_9 | Pipe Culverts | Granular Bedding to conform to Table in Section 02641 sieve designation | 1 | ○ | 10 |
| 20 | M_10 | Pipe Culverts | Submit manufacturer test data and certification 4 weeks prior to commencing work. Certification to be marked | 1 | ○ | 1 |
| 21 | M_11 | Pipe Culverts | To install pipes in accordance with section 02641 3.3-3.6 Must backfill with a minimum 900mm of overcompacted | 1 | ○ | 20 |
| 23 | M_12 | QA/QC | Continuous Improvement Report (QD163). Document cost saving inititives by coordinating with QA manager | 1 | ○ | 1 |
| 25 | M_14 | Quality | Ensure that calibration information is present with survey equipement, torque wrenches and scales | 1 | ○ | 15 |
| 30 | M_19 | Safety | Check WHMIS labelling compliance | 1 | ○ | 1 |
| 31 | M_20 | Safety | Coordinate Safety Program: fill out incident reports/accident report/near miss report as required and | 1 | ○ | 1 |
| 32 | M_21 | Safety | Daily Inspection and Approval of Scaled Rock Face Prior to Crew Entry | 1 | ○ | 1 |
| 33 | M_22 | Safety | Daily Safety Meetings are being carried out | 1 | ○ | 1 |
| 34 | M_23 | Safety | Does a Traffic Control Plan need to be done and documented. Worker Acknowledgement Form from JARR | 1 | ○ | 1 |
| 35 | M_24 | Safety | Ensure all employees are adhering to the Traffic Protection Plan, including clearances for use by | 1 | ○ | 1 |
| 36 | M_25 | Safety | Ensure all roadways and ramps are maintained in good condition to allow safe travel by any site equipment | 1 | ○ | 1 |
| 37 | M_26 | Safety | Ensure that appropriate PPE including different types of gloves (impact/anti-vibration, cut resistant,....)and | 1 | ○ | 1 |
| 38 | M_27 | Safety | Ensure that berms, barriers, or other protective devices are installed and maintained in area where vehicles | 1 | ○ | 1 |
| 39 | M_28 | Safety | Ensure that appropriate signs are posted ex (Traffic Control Persons Ahead,) and installed in accordance | 1 | ○ | 1 |
| 40 | M_29 | Safety | Ensure Workers are reporting any NEAR MISSES to yourself, however minor it may seem. | 1 | ○ | 1 |
| 41 | M_30 | Safety | Maintain competent signal flag operators to perform work and protect the public. | 1 | ○ | 1 |
| 42 | M_31 | Safety | Personal Protective Equipment: Site specific (i.e.. Earplugs, glasses, SA safety boot, reflective vest, Hard | 1 | ○ | 1 |
| 43 | M_32 | Safety | Remove boulders & fragments which may slide or roll into excavated areas | 1 | ○ | 1 |
| 44 | M_33 | Safety | Report All INCIDENTS, ACCIDENTS AND NEAR MISSES immediatly to Owner's Representative and | 1 | ○ | 50 |
| 45 | M_34 | Safety | Review: Incidents, Close Calls and Near Miss' with employees while conducting Weekly Safety Meeting for | 1 | ○ | 1 |
| 46 | M_35 | Safety | The appropriate First Aid kits are located in site trailers and company vehicles. Contact H & S Advisor if supplies | 1 | ○ | 1 |
| 47 | M_36 | Safety | Verify that all employees on site have received the proper induction, WHMIS, norcat, truck driver training | 1 | ○ | 1 |
| 48 | M_37 | Safety | Weekely Safety Meetings are being carried out. | 1 | ○ | 1 |
| 49 | M_38 | Shiftwork-cross shift | 1) Between 6:00 am and 6:30am: Discuss daily areas of concern with x-shift and discuss daily production targets | 1 | ○ | 1 |
| 50 | M_39 | Shiftwork-cross shift | 2) Between 6:00 pm and 6:30 pm: Discuss daily areas of concern with x-shift and discuss daily production targets | 1 | ○ | 1 |
| 52 | M_41 | Tandem Trucks and | New drivers burn clutches out like crazy - make sure that they are trained and checked out. | 1 | ○ | 1 |
| 53 | M_42 | Track equipment | Make sure that operators are cleaning packed material from undercarriage after their shift | 1 | ○ | 1 |

Fig. 6a

| | B | C | D | E | F | G |
|---|---|---|---|---|---|---|
| 54 | M_43 | Watermain | Colour codes for pipe: white/grey for forcemains, blue for watermains, green for sewers, black for other | 1 | ○ | 1 |
| 55 | M_44 | Watermain | Lay pipes according to Manufacturers specifications and install in according to 02511 p.8-10. | 1 | ○ | 1 |
| 56 | M_45 | Watermain | Place granular bedding material in uniform layers not exceeding 150mm compacted thickness to depth of | 1 | ○ | 1 |
| 57 | M_46 | Watermains | After flushing period obtain water samples at location approved by the Engineer'.# of test results described in | 1 | ○ | 1 |
| 58 | M_47 | Watermains | As per section 02315 3.3.13.1 excavation fill under footing w/footing concrete. | 1 | ○ | 1 |
| 59 | M_48 | Watermains | At each connection site, provide an O.I.T. (operator in training) certified personnel and supervisors to oversee | 1 | ○ | 1 |
| 60 | M_49 | Watermains | Casing Installation in conformance to section 02511 p.10-11 | 1 | ○ | 1 |
| 61 | M_50 | Watermains | Follow the general installation procedures indicated in section 02511. | 1 | ○ | 1 |
| 62 | M_51 | Watermains | Install valve to manufacturers recommendations. | 1 | ○ | 1 |
| 63 | M_52 | Watermains | Make sure the bolts on connector sleeves are torqued to specifications before testing or backfilling trenches. | 1 | ○ | 1 |
| 64 | M_53 | Watermains | Must advise Consultant 24 hrs in advance of all proposed tests, must have them present for testing. | 1 | ○ | 1 |
| 65 | M_54 | Watermains | Per Add. 1 Advise PJV construction procedure for relocating watermains (Staging, coordination, & tie-ins. | 1 | ○ | 1 |
| 66 | M_55 | Watermains | Per Add. 1 Advise PJV size of watermain castings. | 1 | ○ | 1 |
| 67 | M_56 | Watermain | Per section 02315 excavation, trench, backfill have owner locate existing watermain | 1 | ○ | 1 |
| 68 | M_57 | Watermains | Perform hydrostatic testing in accordance with OPSS 701.07.22.01 Testing frequency described in Section | 1 | ○ | 1 |
| 69 | M_58 | Watermains | Pipe Protection: Provide a 500mm thick concrete bulkhead (min 25 Mpa) at each end of each casing. | 1 | ○ | 1 |
| 70 | M_59 | Watermains | Pipe Surround once consultant has inspected, hand place surround material in uniform layers of 150mm indicated | 1 | ○ | 1 |
| 71 | M_60 | Watermains | Provide 48 hrs notice to the Public works department prior to the operation of any valve, or watermain shut | 1 | ○ | 1 |
| 72 | M_61 | Watermains | Provide copies of the lab result to the Engineer to prove compliance. | 1 | ○ | 1 |
| 73 | M_62 | Watermains | Provide record dwgs, including directions for operating valves, list of equipment req'd for operating valves, list of | 1 | ○ | 1 |
| 74 | M_63 | Watermains | Provide to Consultant Forms: 3G Personnel, 3H Current Project, and Safety Policy. | 1 | ○ | 1 |
| 75 | M_64 | Watermains | Provide written results to Engineer. Repeat the chlorination and testing process if coliforms are present | 1 | ○ | 1 |
| 76 | M_65 | Watermains | Samples to be brought to a testing laboratory | 1 | ○ | 1 |
| 77 | M_66 | Watermains | Submit manufacturer test data and certification that pipe material meet requirements of section 02511 at least 4 | 1 | ○ | 1 |
| 78 | M_67 | Watermains | Testing pipeline in section not exceeding 250m in lenght. | 1 | ○ | 1 |
| 79 | M_68 | Watermains | Thrust blocks are in accordance with 02511 p.11 and Section 03300 (Cast in place Concrete). | 1 | ○ | 1 |
| 80 | M_69 | Watermains | Trenching to conform to excavation and trenching. Depth to provide a cover of not less than 2.4m from | 1 | ○ | 1 |
| 81 | M_70 | Watermains | Wash all connection materials, piping, and tools with a strong chlorine solution during installation. | 1 | ○ | 1 |
| 82 | M_71 | Watermains | Where any section of system is provided with concrete thrust block, conduct tests at least 5 days after placing | 1 | ○ | 1 |
| 83 | M_72 | Watermains | Where any section of system is provided with concrete thrust block, conduct tests at least 5 days after placing | 1 | ○ | 1 |

Fig. 6b

METHOD AND SYSTEM FOR SELECTING A SUBSET OF INFORMATION TO COMMUNICATE TO OTHERS FROM A SET OF INFORMATION

FIELD OF THE INVENTION

The present invention relates generally to methods and systems for selecting a subset of information from a set of information. More particularly, the present relates to methods and systems for selecting the subset of information, to communicate to others, from a set of information, and for tracking the information communicated to the others.

BACKGROUND OF THE INVENTION

In many fields of endeavor there are vast quantities of information which need to be organized, communicated to others, and tracked to make sure that the right message(s) are conveyed to the right people at the right times in order to obtain the right results. In some cases, the communication of certain information to others is required for compliance with governing laws and regulations.

For example in many fields such as the construction industry, where there is a risk of injury to employees, the employers are required to provide training to their employees during the course of which certain information, i.e. safety information, is conveyed to the employees for compliance with laws and regulations.

However, as mentioned above, some fields of endeavor, a good example of which is the construction industry, have vast quantities of information, for example information pertaining to worker safety. As one can imagine, all of the available safety information could not be conveyed to all of an organization's employees in the course of a single training session. Since the information needs to be communicated to others over the course of several training sessions, and in view of the fact that employee turn out to the training sessions may be inconsistent, especially when the workforce is large, it is difficult to ensure that all employees receive the appropriate information.

One can also appreciate that not all of the available information has the same level of importance, and so reaching a good balance of very important, and useful but less important information adds to the challenge. As does ensuring that very important information is emphasized through repetition to ensure that it is retained by the employees.

In view of the above, it comes as no surprise that selecting what information to present to the employees, when, and with what frequency, is a difficult, and time consuming process.

Some prior attempts at managing information include: U.S. Pat. Nos. 7,246,316; 6,148,330; 6,580,438; 6,516,340; 6,745,195; and 5,456,473, and U.S. Patent Publication Nos. 2005/0223314; 2009/0135007; 2002/0198755; and 2005/0197856.

Furthermore, KnowledgeWare Communications Corp. runs a website at http://www.kccsoft.com/simplytracking.asp that promises tracking and scheduling cyclic company training, which allow employees to login to view their past and forecast future safety training and items issued to them.

However, there is a continuing need for improvements in information management. What is desired therefore, are systems and methods which overcome at least some of the problems associated with prior art methods and systems.

SUMMARY OF THE INVENTION

Preferably, embodiments of the present invention will address the problem of managing the vast quantities of information which need to be organized, communicated to others, and tracked to make sure that the right message(s) are conveyed to the right people at the right times in order to obtain the right results.

Accordingly, an embodiment of the present invention enables a user to automatically generate a subset of information from a set of information to communicate to others, by randomly selecting from the set of information a predetermined number of content items. The selection is based on relative priorities that are assigned to each of the plurality of content items in the set of information. The predetermined number of content items selected is of course less than the total number of the plurality of content items in the set of information, and the subset of information is a random and prioritized subset of the set of information. The same or other embodiments further enable tracking of the information communicated to others, so that subsequent selections select more of said set of information not already selected in a previous selection step. Furthermore, the ability to track the information communicated to others will ensure that all of the intended recipients of the information, i.e. employees of a work force, receive the intended information, at the intended time(s), with the intended frequency(ies).

Embodiments of the present invention will find utility in numerous fields of endeavour requiring communication of information to others, including for example information comprising safety information, health information, quality control information, accounting information, training information, insurance information, business information, management information, operational control information, information technology information, telecommunications information, and audit information.

Therefore, in accordance with one aspect of the present invention, there is provided a method for selecting a subset of information to communicate to others from a set of information comprising a plurality of content items, the method comprising the steps of:

storing said set of information in a user retrievable format;

assigning a relative priority to each of said plurality of content items; and automatically generating the subset of information by selecting a predetermined number of said plurality of content items from said set of information based on the relative priorities of each of the plurality of content items;

wherein said predetermined number is less than the number of said plurality of content items; and wherein said subset of information is a prioritized subset of said set of information.

In accordance with another aspect of the present invention there is provided a computer readable medium carrying computer readable instructions for carrying out the above method.

In accordance with yet another aspect of the present invention there is provided a system for selecting a subset of information to communicate to others from a set of information comprising a plurality of content items, the system comprising:

a storing means configured to store said set of information in a computer readable format;

a processor having input means, said processor being in communication with the storing means, and being configured to a) enable a user to:

i) input said plurality of content items into said storing means, ii) assign a relative priority to each of said plurality of content items, and iii) input user commands; and b) automatically output the subset of information, in response to one of said user commands, by selecting a predetermined number of said plurality of content items from said set of information based on the relative priorities of each of the plurality of content items, wherein said predetermined number is less than the number of said plurality of content items, and wherein said subset of information is a prioritized subset of said set of information.

BRIEF DESCRIPTION OF THE DRAWINGS

Reference will now be made to the preferred embodiments of the present invention with reference, by way of example only, to the following drawings in which:

FIG. 2 is a checklist according to an embodiment of the present invention;

FIG. 3 is a publication according to an embodiment of the present invention;

FIG. 4 is a table of contents for a presentation according to an embodiment of the present invention;

FIG. 6a is an extract from a Microsoft® Excel® spreadsheet showing a set of information containing content items, according to another embodiment of the present invention; and FIG. 6b is a continuation of the extract of FIG. 6a.

DETAILED DESCRIPTION OF THE PREFERRED EMBODIMENTS

The present invention is described in more detail with reference to exemplary embodiments thereof as shown in the appended drawings. While the present invention is described below including preferred embodiments, it should be understood that the present invention is not limited thereto. Those of ordinary skill in the art having access to the teachings herein will recognize additional implementations, modifications, and embodiments which are within the scope of the present invention as disclosed and claimed herein. In the figures, like elements are given like reference numbers. For the purposes of clarity, not every component is labelled in every figure, nor is every component of each embodiment of the invention shown where illustration is not necessary to allow those of ordinary skill in the art to understand the invention.

Figure 1:
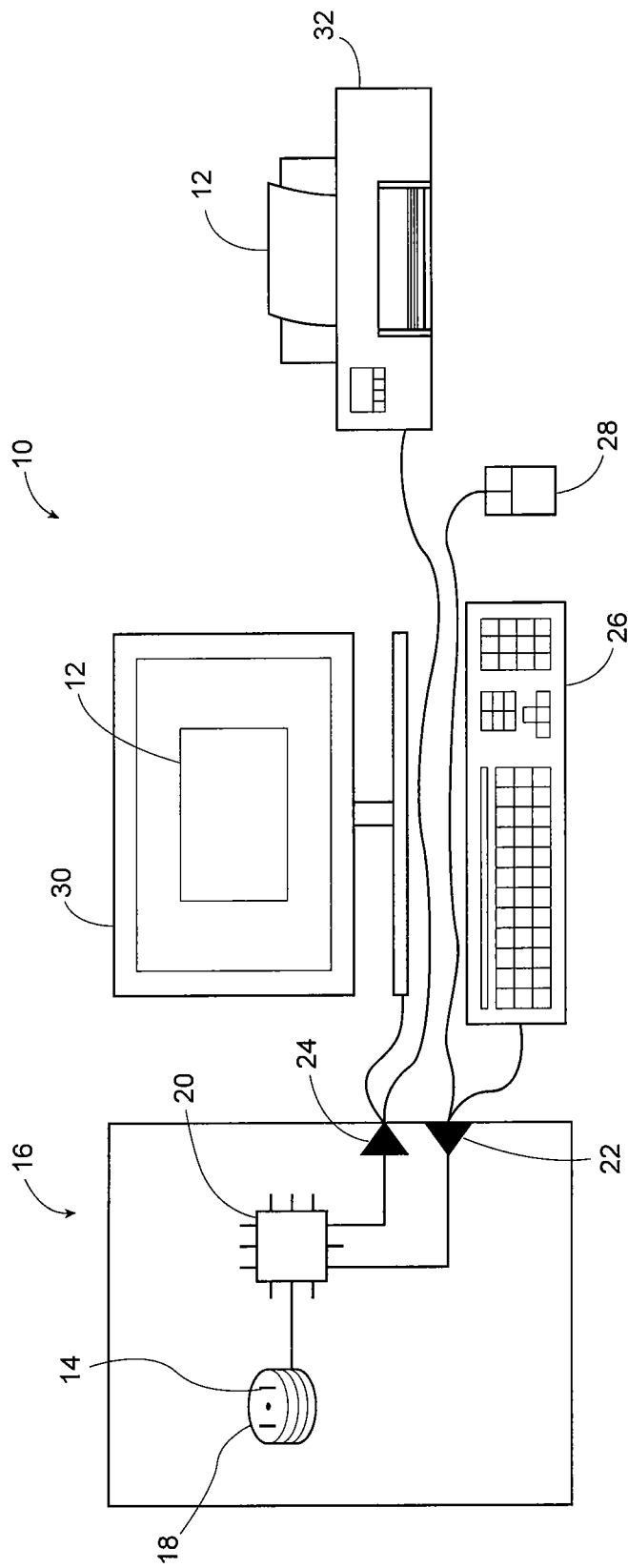
FIG. 1 is a diagram of a system for selecting a subset of information to communicate to others from a set of information comprising a plurality of content items according to an embodiment of the present invention.

With reference to FIG. 1 there is shown generally with reference numeral 10, a system a system for selecting a subset of information 12 to communicate to others from a set of information 14 according to an embodiment of the present invention. The system 10 comprises a computer 16 housing, among other things typically found in a computer, a storing means 18 and a processor 20. The storing means 18 is configured to store the set of information 14 in a computer readable format. The processor 20 is operably connected to, and in communication with, the storing means 18. The processor 20 is also connected to an input port 22 and an output port 24. One or more input means such as for example a keyboard 26, a mouse 28, a keypad, a wireless transmitter, a computer readable medium, and/or a sound recognition device, may be connected to the processor 20 via the input port 22. One or more output means such as for example a display 30, a printer 32, a projector, a wireless transmitter, a computer readable medium, and/or a sound emitting device may be connected to the processor 20 via output port 24. The processor 20 is configured to enable a user to input the set of information 14 in the form of a plurality of content items into the storing means 18 via the input means 26, 28. The processor is further configured to enable the user to assign a relative priority 34 to each of the plurality of content items making up the set of information 14, and input user commands via the input means 26, 28.

In response to one of the user commands, the processor 20 is further configured to automatically output the subset of information 12 via the output means 30, 32. Preferably the processor 20 is configured to select a predetermined number of the plurality of content items from the set of information 14 stored in the storing means 18. The subset of information 12 is preferably selected by the processor 20 based on the relative priorities assigned to each of the plurality of content items. As will be appreciated, the predetermined number of the plurality of content items selected for inclusion in the subset of information 12 will be less than the total number of the plurality of content items making up the set of information 14. In result therefore, the subset of information will be a prioritized subset of the set of information 14 stored in the storing means 18.

In response to subsequent user commands, the processor may be optionally configured to automatically output subsequent subsets of information which contain more of the set of information 14 not already included in previous subsets of information 12. As will be appreciated, this may be accomplished by either (i) removing from the set of information 14 content items already selected by the processor 20 for inclusion in a previous subset of information 12, or (ii) ignoring the content items already selected by the processor 20 for inclusion in a previous subset of information 12 if picked again by the processor 20. In any event, under some circumstances it may be desired that some or all content items already selected for inclusion in a subset of information 12 remain in the set of information 14 and/or are not ignored by the processor 20 so that they are still available for inclusion in a subsequent subset of information 12. For clarity, it is contemplated that if desired, the processor can be configured so that specific content items (e.g. S0001), or those belonging to one of the three categories of relative priorities (e.g. highest relative priority, lowest relative priority, or intermediate relative priorities) may be set by the user to be available for inclusion in subsequent subsets of information, even if they have already been selected and included in a previous subset of information. By the same token the processor can also be configured so that specific content items (e.g. S0001), or those belonging to one of the three categories of relative priorities (e.g. highest relative priority, lowest relative priority, or intermediate relative priorities) may be set by the user to not be available for inclusion in subsequent subsets of information, if they have already been selected and included in a previous subset of information. Accordingly, the system 10 may optionally be provided with a means for configuring the function of the processor 20 to enable the user to enable or disable this optional feature.

It is contemplated that the set of information 14 may comprise any information that a user desires to communicate to others. Some examples of the type of information that may be included in the set of information are safety information, health information, quality control information, accounting information, training information, insurance information, business information, management information, operational control information, information technology information, telecommunications information, and audit information. Accordingly, the plurality of content items making up the set of information 14 may comprise, for example, topics relating to worker safety, worker health, worker training, insurance, business, management, operational control, information technology, telecommunications, and audits. However, these lists are not meant to be exhaustive, and persons skilled in the art will appreciate many other forms of information and topics to which the present invention will lend itself to, all of which are comprehended by the present invention.

For convenience and clarity, the following discussion and examples will limit the set of information 14 to safety information, and thus the plurality of content items will be limited to worker safety topics.

Preferably, each of the plurality of content items making up the set of information 14 will include a descriptor sufficiently detailed so as to be recognizable to the user. For example, a content item may be provided with a designation S0001 and include as a descriptor the expression "Access Exits Clear and Marked". Such a descriptor would convey to a worker safety officer the need to communicate to others safety information relating to requirements to clearly mark access exits in a building and to keep the access exits clear and unobstructed. More preferably the content items will be linked to additional information relating thereto, for example with a hyper link associated with a website, server, or other location address. It is contemplated that the additional information may be stored locally in the storing means 18 in a computer readable format. Alternately, the additional information may be stored remotely and accessible by the processor 20 via a wired or wireless connection to the internet or an intranet. The additional information may be in the form of particulars relating to the content item or to a source of the particulars. For example, for the above content item designated S0001, the particulars may include the following write-up, the full text of which is available from the International Council of Toy Industries website located at <http://www.toy-icti.org/info/exits.html>:

"3.1 Exit paths must be clearly identifiable and clearly marked with visible signs if the path is not immediately apparent. Floor markings and arrows are often used to direct people to the emergency exit doors.

3.2. Exit paths must be clear and consideration must be given to adequate path width for occupancy. Exit paths should not be routed through boiler rooms and other high hazard areas.

3.3. Exit paths and exit doors must be distinguishable during emergency conditions. Exit doors must be marked and illuminated to provide a visible sign during emergencies. Exit paths must be illuminated to assist people in traveling to the emergency exit doors. All illumination must be reliable during an emergency.

...",

Alternately, the particulars may include the following link: "http://www.toy-icti.org/info/exits.html".

Table 1 below shows a sample set of information 14 containing eight content items numbered S0001 to S0008, and their associated descriptors.

TABLE 1

| CONTENT ITEM | DESCRIPTION |
|---|---|
| S0001 | Access Exits Clear and marked |
| S0002 | Face Protection, shield when using grinder |

TABLE 1-continued

| CONTENT ITEM | DESCRIPTION |
|---|---|
| S0003 | Foot Protection |
| S0004 | Hard hats/Head protection |
| S0005 | Hearing Protection |
| S0006 | Respiratory Protection |
| S0007 | If accidents occur check condition of clothing and note names of PPE in poor condition? |
| S0008 | 011 Incidents prescribed for the purpose of Sec. 53 of the Act |

Each of the plurality of content items in the set of information 14 is assigned a relative priority as shown in Table 2 below.

TABLE 2

| CONTENT ITEM | DESCRIPTION | PRIORITY |
|---|---|---|
| S0001 | Access Exits Clear and marked | 1 |
| S0002 | Face Protection, shield when using grinder | 100 |
| S0003 | Foot Protection | 3 |
| S0004 | Hard hats/Head protection | 4 |
| S0005 | Hearing Protection | 5 |
| S0006 | Respiratory Protection | 9 |
| S0007 | If accidents occur check condition of clothing and note names of PPE in poor condition? | 0 |
| S0008 | 011 Incidents prescribed for the purpose of Sec. 53 of the Act | 3 |

The relative priorities are a symbol or number reflecting the importance of the content items with which they are associated relative to other content items of the plurality of content items in the set of information 14. Preferably, the processor 20 is configured to enable the user to enter and change the relative priority of at least one of the plurality of content items. Preferably, the processor 20 is also configured to change the relative priority assigned to at least one content item based on its significance to a particular time of year. For example, the particular time of year may be a particular, week, month, quarter, or season.

According to an embodiment of the invention each of the relative priorities is selected from the group consisting of: a) a highest relative priority, b) a lowest relative priority, and c) intermediate relative priorities. For purposes of this example, the relative priorities will be numbers, particularly integers, ranging from 0 to 100. Thus 0 is the lowest relative priority, 100 is the highest relative priority, and 1 to 99 are intermediate relative priorities. As shown in the above Table 2, content item S0002 has a highest relative priority, in this case the number 100, content item S0007 has a lowest relative priority, in this case the number 0, and the remaining content items have intermediate priorities with numbers ranging from 1 to 9. More than one content item may have a highest relative priority of 100, and more than one item may have a lowest relative priority of 0. For that matter, more than one content item may have the same intermediate priority, for example 3.

The subset of information 12 is limited to a predetermined number of content items, with the proviso that the predetermined number is less than the total number of content items contained in the set of information 14. The predetermined number, which is preferably adjustable by the user or by the processor 20, may be determined taking into account any of a number of considerations, including the amount of space available on a sheet of print media, the amount of time available to a user to process the subset of information 12, or the maximum number of content items a user is able to process in a given period of time. Preferably the processor 20 is configured to output the subset of information 12 by: a) determining an amount of time available to a user to process the subset of information; b) determining an average time required to process one of the plurality of content items in the set of information; and c) adjusting the predetermined number by dividing the amount of time in step a) by the average time in step b). For example, it may be desirable for a user to prepare a safety presentation having running time of one hour. Accordingly, the processor 20 of the preferred system 10 will a) determine, for example by prompting the user, that the available time is one hour; b) determine, for example by prompting the user, that the average time required to process one of the plurality of content items in the set of information 14 is fifteen minutes; and c) adjust the predetermined number to four, which is obtained by dividing one hour by fifteen minutes. Alternately, the predetermined number may be set to a default value, and adjusted by the user in accordance with their needs. However, for a benefit to be derived from the present invention, the predetermined number must be less than the total number of the plurality of content items making up the initial set of information.

For the purposes of the present discussion the predetermined number of content items to be included in the subset of information 12 will be set to five. Accordingly, if the set of information contains one or more content items assigned the highest relative priority, in this case 100, the processor 20 is configured to select for inclusion in the subset of information 12 all content items assigned the highest relative priority, with the proviso that the set of data 14 contains no more content items assigned the highest relative priority than the predetermined number.

By way of example, Table 3 below shows a selection from the prioritized set of information 14 in Table 2, of all content items assigned the highest relative priority for inclusion in the subset of information 12 having a predetermined number of five.

TABLE 3

| SUBSET NO. | CONTENT ITEM | DESCRIPTION |
|---|---|---|
| 1 | S0002 | Face Protection, shield when using grinder |
| 2 | | |
| 3 | | |
| 4 | | |
| 5 | | |

Alternately, it is contemplated that the processor 20 may be configured to adjust the predetermined number of the plurality of content items to be equal to or greater than the number of the content items assigned the highest relative priority, and selecting all content items assigned the highest relative priority. Alternately still, it is contemplated that the processor 20 may be configured to output the subset of information 12 by randomly selecting one or more of the content items assigned the highest relative priority.

Next, if the set of information 14 contains one or more content items assigned the lowest relative priority, in this case zero, the processor 20 is configured to ignore all content items assigned the lowest relative priority.

By way of example, Table 4 below shows the set of information 14 after the processor 20 selects all content items with the highest relative priority (i.e. S0002) and ignores all content items with the lowest relative priority (i.e. S0007).

TABLE 4

| CONTENT ITEM | DESCRIPTION | PRIORITY |
|---|---|---|
| S0001 | Access Exits Clear and marked | 1 |
| S0003 | Foot Protection | 3 |
| S0004 | Hard hats/Head protection | 4 |
| S0005 | Hearing Protection | 5 |
| S0006 | Respiratory Protection | 9 |
| S0008 | 011 Incidents prescribed for the purpose of Sec. 53 of the Act | 3 |

Next, if the set of information 14 contains one or more content items assigned intermediate priorities, the processor 20 is configured to randomly select content items assigned the intermediate relative priorities. Preferably each of the intermediate priorities has an associated weight, the weights reflecting the relative importance of the content items to which they are assigned. For example, a content item assigned a first intermediate relative priority associated with a first weight has a better chance of random selection than a second content item assigned a second intermediate relative priority associated with a second weight, if the first weight is greater than the second weight.

One way in which the random but prioritized selection may be achieved is to prepare a pre-selection list by entering all of the content items assigned intermediate relative priorities, and repeating each entry by the values of the priorities. Accordingly, since in the above example content item S0003 is assigned an intermediate relative priority of three, it should appear in the pre-selection list three times. By way of example, Table 5 below shows such a pre-selection list.

TABLE 5

| CONTENT ITEM | DESCRIPTION |
|---|---|
| S0001 | Access Exits Clear and marked |
| S0003 | Foot Protection |
| S0003 | Foot Protection |
| S0003 | Foot Protection |
| S0004 | Hard hats/Head protection |
| S0004 | Hard hats/Head protection |
| S0004 | Hard hats/Head protection |
| S0004 | Hard hats/Head protection |
| S0005 | Hearing Protection |
| S0005 | Hearing Protection |
| S0005 | Hearing Protection |
| S0005 | Hearing Protection |
| S0005 | Hearing Protection |
| S0006 | Respiratory Protection |
| S0006 | Respiratory Protection |
| S0006 | Respiratory Protection |
| S0006 | Respiratory Protection |
| S0006 | Respiratory Protection |
| S0006 | Respiratory Protection |
| S0006 | Respiratory Protection |
| S0006 | Respiratory Protection |
| S0006 | Respiratory Protection |
| S0008 | 011 Incidents prescribed for the purpose of Sec. 53 of the Act |
| S0008 | 011 Incidents prescribed for the purpose of Sec. 53 of the Act |
| S0008 | 011 Incidents prescribed for the purpose of Sec. 53 of the Act |

Next, the processor 20 randomly selects one entry from the pre-selection list for inclusion in the subset of information 12, for example S0005, as shown in Table 6 below.

TABLE 6

| SUBSET NO. | CONTENT ITEM | DESCRIPTION |
|---|---|---|
| 1 | S0002 | Face Protection, shield when using grinder |
| 2 | S0005 | Hearing Protection |
| 3 | | |
| 4 | | |
| 5 | | |

As will be appreciated by persons skilled in the art, in order to achieve the random selection, the processor 20 will preferably be provided with a random, or pseudo random, number generator to facilitate the random selection of entries from the pre-selection list for inclusion in the subset of information 12.

For example, the processor 20 can take the pre-selection list of entries in Table 5 and associate with each entry a consecutive trigger number, such as 1 to 25 as shown in Table 5a below. The random number generator may then be configured to randomly generate an integer between, in this example, 1 and 25, and compare it to the trigger numbers associated with the entries. Thus, assuming for example, that the random number generator generated the integer 13, then the content item to be selected by the processor 20 would be S0005 representing Hearing Protection.

TABLE 5a

| CONTENT ITEM | DESCRIPTION | Trigger Number |
|---|---|---|
| S0001 | Access Exits Clear and marked | 1 |
| S0003 | Foot Protection | 2 |
| S0003 | Foot Protection | 3 |
| S0003 | Foot Protection | 4 |
| S0004 | Hard hats/Head protection | 5 |
| S0004 | Hard hats/Head protection | 6 |
| S0004 | Hard hats/Head protection | 7 |
| S0004 | Hard hats/Head protection | 8 |
| S0005 | Hearing Protection | 9 |
| S0005 | Hearing Protection | 10 |
| S0005 | Hearing Protection | 11 |
| S0005 | Hearing Protection | 12 |
| S0005 | Hearing Protection | 13 |
| S0006 | Respiratory Protection | 14 |
| S0006 | Respiratory Protection | 15 |
| S0006 | Respiratory Protection | 16 |
| S0006 | Respiratory Protection | 17 |
| S0006 | Respiratory Protection | 18 |
| S0006 | Respiratory Protection | 19 |
| S0006 | Respiratory Protection | 20 |
| S0006 | Respiratory Protection | 21 |
| S0006 | Respiratory Protection | 22 |
| S0008 | 011 Incidents prescribed for the purpose of Sec. 53 of the Act | 23 |
| S0008 | 011 Incidents prescribed for the purpose of Sec. 53 of the Act | 24 |
| S0008 | 011 Incidents prescribed for the purpose of Sec. 53 of the Act | 25 |

However, it is contemplated that the trigger number associated with each entry in the pre-selection list may be a range of numbers, which may be other than integers such as for example 0.0117-0.0349, and the random number generator may be configured likewise to generate random non-integer, or real numbers between zero and one. If the random selection involves using non-integer numbers it may also be necessary to implement a means to adjust for rounding errors. It will be understood that rounding errors in the selection process can introduce bias into the selection process and lead to a reduced diversity in the subset(s) of information automatically generated by the system 10 which is counter to the present invention.

By way of example, every entry in the pre-selection list of entries in Table 5 may be associated with a trigger range of low and high numbers using the following formulas:

First Entry

Trigger Number Low = 0

$$\text{Trigger Number High} = \frac{\text{Entry Number}}{\text{Total Number of Entries}}$$

Subsequent Entries

Trigger Number Low = Previous Trigger Number High $$\text{Trigger Number High} = \frac{\text{Entry Number}}{\text{Total Number of Entries}}$$

Thus, rounding to 4 decimal places:

the first entry in Table 5 would be associated with a Trigger Range of numbers: 0 to 1/25=0.0400;

the second entry in Table 5 would be associate with a Trigger Range of numbers: 0.0400 to 2/25=0.0800;

the third entry in Table 5 would be associate with a Trigger Range of numbers: 0.0800 to 3/25=0.1200;

. . .

the last entry in Table 5 would be associated with a Trigger Range of numbers: =0.9600 to 1.

In this example, the high trigger number of one entry is the same as the low trigger number of the next entry, therefore the processor 20 will need to be configured to select either the one or the other entry from the pre-selection list if the random number generator generates a number the two entries share in common. Alternately, the trigger ranges associated with the entries may be selected so that they are consecutive with no overlapping numbers. Accordingly, in this example, entry 1 in the pre-selection list in Table 5 (i.e. S0001—Access Exits Clear and marked) will be selected if the random number generator generates a random number in the range of 0 to 0.04.

After random selection from the pre-selection list in Table 5, the selected entry and its repetitions are preferably removed from the pre-selection list, as shown in Table 7, and the selection process is repeated. With each random selection from the pre-selection list, the pre-selection list gets shorter and the subset of information 12 gets longer, as show in Table 8.

TABLE 7

| CONTENT ITEM | DESCRIPTION |
|---|---|
| S0001 | Access Exits Clear and marked |
| S0003 | Foot Protection |
| S0003 | Foot Protection |
| S0003 | Foot Protection |
| S0004 | Hard hats/Head protection |
| S0004 | Hard hats/Head protection |
| S0004 | Hard hats/Head protection |
| S0004 | Hard hats/Head protection |
| S0006 | Respiratory Protection |
| S0006 | Respiratory Protection |
| S0006 | Respiratory Protection |
| S0006 | Respiratory Protection |
| S0006 | Respiratory Protection |
| S0006 | Respiratory Protection |
| S0006 | Respiratory Protection |

TABLE 7-continued

| CONTENT ITEM | DESCRIPTION |
|---|---|
| S0006 | Respiratory Protection |
| S0006 | Respiratory Protection |
| S0008 | 011 Incidents prescribed for the purpose of Sec. 53 of the Act |
| S0008 | 011 Incidents prescribed for the purpose of Sec. 53 of the Act |
| S0008 | 011 Incidents prescribed for the purpose of Sec. 53 of the Act |

TABLE 8

| SUBSET NO. | CONTENT ITEM | DESCRIPTION |
|---|---|---|
| 1 | S0002 | Face Protection, shield when using grinder |
| 2 | S0005 | Hearing Protection |
| 3 | S0008 | 011 Incidents prescribed for the purpose of Sec. 53 of the Act |
| 4 | | |
| 5 | | |

Continuing with the above example, Table 9 shows the pre-selection list after randomly selected entry S0008, and its repetitions have been removed. Table 10 shows the subset of information 12 after a further random selection from the pre-selection list (i.e. S0006) has been made by the processor 20.

TABLE 9

| CONTENT ITEM | DESCRIPTION |
|---|---|
| S0001 | Access Exits Clear and marked |
| S0003 | Foot Protection |
| S0003 | Foot Protection |
| S0003 | Foot Protection |
| S0004 | Hard hats/Head protection |
| S0004 | Hard hats/Head protection |
| S0004 | Hard hats/Head protection |
| S0004 | Hard hats/Head protection |
| S0006 | Respiratory Protection |
| S0006 | Respiratory Protection |
| S0006 | Respiratory Protection |
| S0006 | Respiratory Protection |
| S0006 | Respiratory Protection |
| S0006 | Respiratory Protection |
| S0006 | Respiratory Protection |
| S0006 | Respiratory Protection |
| S0006 | Respiratory Protection |

TABLE 10

| SUBSET NO. | CONTENT ITEM | DESCRIPTION |
|---|---|---|
| 1 | S0002 | Face Protection, shield when using grinder |
| 2 | S0005 | Hearing Protection |
| 3 | S0008 | 011 Incidents prescribed for the purpose of Sec. 53 of the Act |
| 4 | S0006 | Respiratory Protection |
| 5 | | |

Continuing further with the above example, Table 11 shows the pre-selection list after randomly selected entry S0006, and its repetitions have been removed. Table 12 shows the completed subset of information 12 generated by the processor 20 after the final random selection from the pre-selection list (i.e. S0004).

TABLE 11

| CONTENT ITEM | DESCRIPTION |
|---|---|
| S0001 | Access Exits Clear and marked |
| S0003 | Foot Protection |
| S0003 | Foot Protection |
| S0003 | Foot Protection |
| S0004 | Hard hats/Head protection |
| S0004 | Hard hats/Head protection |
| S0004 | Hard hats/Head protection |
| S0004 | Hard hats/Head protection |

TABLE 12

| SUBSET NO. | CONTENT ITEM | DESCRIPTION |
|---|---|---|
| 1 | S0002 | Face Protection, shield when using grinder |
| 2 | S0005 | Hearing Protection |
| 3 | S0008 | 011 Incidents prescribed for the purpose of Sec. 53 of the Act |
| 4 | S0006 | Respiratory Protection |
| 5 | S0004 | Hard hats/Head protection |

Table 13 shows the pre-selection list after randomly selected entry S0004, and its repetitions have been removed. As discussed in more detail below, a subsequent subset of information 12 may be generated by the processor 20 using this pre-selection list.

TABLE 13

| CONTENT ITEM | DESCRIPTION |
|---|---|
| S0001 | Access Exits Clear and marked |
| S0003 | Foot Protection |
| S0003 | Foot Protection |
| S0003 | Foot Protection |

Having the benefit of the above description utilizing arrays for selecting one or more random but prioritized subsets of information 14 from a set of information 12, other mathematical alternatives thereof will be appreciated by persons skilled in the art. Preferably, the random selection process will correct for rounding errors whenever appropriate.

One way to improve the speed with which the random selection process may be carried out for sets of information resulting in large pre-selection lists (i.e. pre-selection lists having more than 1000 entries) is to reduce the number of entries in the pre-selection list proportionally prior to random selection of content items for inclusion in the subset of information 12. This aspect will now be expanded on with referring to FIGS. 6a and 6b, which show a sample Microsoft® Excel® spreadsheet showing a set of information 14 containing fifty-nine content items in rows 35 twelve to eighty-three. Content items in rows thirteen to nineteen are hidden as they having relative priorities of zero (i.e. lowest relative priority) and so are set to be omitted from consideration for inclusion in the subset of information. Had the set of information 14 also included content items with relative priorities of one-hundred (i.e. highest relative priority) they too would have been hidden since they would be set for automatic inclusion in the subset of information 12 as discussed above. The fifty-nine content items remaining in the set of information 14 shown in FIGS. 6a and 6b are associated with intermediate relative priorities ranging from one to fifty, in this example.

The predetermined number of content items desired for the subset of information 12, in this example is five, which requires a reduction factor of 5/59 or 0.0847. However, it is preferable for the reduction factor to include a buffer to ensure that the reduced pre-selection list, from which the subset of information 12 is selected, will contain more content items than the predetermined number so that there will be enough content items for the random selection to complete the subset of information 12. It will be appreciated that if the reduced pre-selection list contains fewer content items than the predetermined number of content items desired in the subset of information, it will be impossible to complete the subset of information with random selection from the reduced pre-selection list, and therefore, a new pre-selection list will need to be generated which will have sufficient content items. In this regard, the preferred buffer is a number between 5 and 40, wherein good results have been obtained with a buffer of 20.

Thus, the preferred reduction factor for generating the reduced pre-selection list from a set of information 14 of for example fifty-nine content items associated with intermediate relative priorities, given that the predetermined number of content items to be included in the subset of information 12 is five, will be calculated as follows:

[(Predetermined Number of Content Items in Subset of Information, i.e. 5)+Buffer (i.e. 20)]÷[Total Number of Content Items in Set of Information, i.e. 59]=0.42.

Having calculated the reduction factor (i.e. 042), the reduced pre-selection list of content items may be created by the following steps:
  a) for each content item in the set of information 14, multiply the relative priority of the content item by the reduction factor;
  b) round the product of a) up to an integer;
  c) subtract the product obtained in a) from the value obtained in b);
  d) generate a random number between 0 and 1;
  e) determine whether the random number generated in d) is greater than or equal to the difference obtained in c), and if yes go to f), if no go to g);
  f) add the content item to the reduced pre-selection list the number of times equalling the value obtained in b);
  g) add the content item to the reduced pre-selection list the number of times equalling the value obtained in b) minus one, with the proviso that if the result is zero, the content item will be omitted from the reduced pre-selection list altogether.

By way of example, the first content item in row 12 in FIG. 6a has a relative priority of one, and will be considered for inclusion in the reduced pre-selection list as follows:
  a) multiply the relative priority of the content item (i.e. 1) by the reduction factor (i.e. 0.42)=0.42;
  b) round the product of a) (i.e. 0.42) up to an integer (i.e. 1);
  c) subtract the product obtained in a) (i.e. 0.42) from the value obtained in b) (i.e. 1)=0.58;
  d) generate a random number between 0 and 1 (i.e. 0.7);
  e) determine whether the random number generated in d) (i.e. 0.7) is greater than or equal to the difference obtained in c) (i.e. 0.58)=True, therefore go to f);
  f) add the content item to the reduced pre-selection list the number of times equalling the value obtained in b) (i.e. 1).

Therefore, according to the above example, the first content item in row 12 in FIG. 6a will be included in the reduced pre-selection list a total of one time. If on the other hand, the random number generated was less than 0.58 (i.e. 0.3), step e) would be False and we would proceed to step g) requiring us to add the first content item in row 12 in FIG. 6a to the reduced pre-selection list the number of times equalling the value obtained in b) (i.e. 1) minus one, which equals zero, meaning the content item is to be omitted from the reduced pre-selection list altogether.

Continuing with the above example, the second content item in row 20 having a relative priority of ten will be considered for inclusion in the reduced pre-selection list of content items as follows:
  a) multiply the relative priority of the content item (i.e. 10) by the reduction factor (i.e. 0.42)=4.2;
  b) round the product of a) (i.e. 4.2) up to an integer (i.e. 5);
  c) subtract the product obtained in a) (i.e. 4.2) from the value obtained in b) (i.e. 5)=0.8;
  d) generate a random number between 0 and 1 (i.e. 0.9341);
  e) determine whether the random number generated in d) (i.e. 0.9341) is greater than or equal to the difference obtained in c) (i.e. 0.8)=True, therefore go to f);
  f) add the content item to the reduced list the number of times equalling the value obtained in b) (i.e. 5).

Therefore, according to the above example, the second content item in row 20 would be included in the reduced pre-selection list a total of five times. If on the other hand, the random number generated was less than 0.7 (i.e. 0.3415), step f) would be False and we would proceed to step g) requiring us to add the content item to the reduced pre-selection list the number of times equalling the value obtained in b) (i.e. 5) minus one, which equals 4 times.

The resulting reduced pre-selection list may be set up as an array in the same way as discussed earlier, for example with respect to Table 5a above, and random selection for inclusion in the subset of information 12 can proceed.

According to another embodiment of the present invention, however, the pre-selection list may be set up as a text string, for example as follows:

AB*20*20*20*20*22*22*22*22*22*22*22*22*25
*25*25*25*25*25*30*31*32*38*41*43*44*44*44
*44*44*44*44*44*44*44*44*44*44*44*44*44*44
*44*44*44*44*47*48*49*53*59*60*63*64*65*71
*72*76*77*80*82*83

In this example, the text string begins with the letters AB followed by numbers separated by an asterisk ("*"). The letters AB are chosen arbitrarily, but what is important as discussed in more detail below is that the number of letters in the start sequence equals the number of digits in the highest row number containing a content item. The numbers in the text string represent the row numbers corresponding to the content items associated with intermediate relative priorities in the Excel® spreadsheet shown in FIGS. 6a and 6b. The asterisk symbol is also arbitrarily chosen, and functions as a delimiter separating the row numbers. Accordingly, if for example, the highest row number was 1234, the pre-selection list would be set up as a text string in the format "ABCD*0020*0020*0020* . . . ".

The first content item is selected for inclusion in the subset of information 12 by randomly selecting a row number from the above text string and matching it up with the content item in the Excel® spreadsheet shown in FIGS. 6a and 6b. This may be accomplished by generating a random number which is an integer, between a low of 1 and a high calculated as the difference between the total number of characters in the text string and the number of characters in the start sequence. Since the text string mentioned above beginning with "AB*20*20" has eighty characters and the start sequence has two characters, the random number generator will be set to generate a random number between one and seventy-eight for the first selection from the above text string. Next a pointer is moved to the character in the text string that is at a position in the text string equal to the random number. A check is made to see whether the character at the pointer is a delimiter, namely, the asterisk symbol ("*"). If it is, then the row number is selected, and the content item associated with that row number in the Excel® spreadsheet in FIGS. 6a and 6b is included in the subset of information 12. Otherwise, the pointer moves to the next character until it finds an asterisk, and selects the row number. Once a row number is selected, all instances of the row number are removed from the text string, and the selection process begins a new for the next content item, and so on, until the subset of information 12 is complete.

By way of example, if the random number generator generates a random number of four, the pointer will land on the number two in the above text string. Since the number two is not the delimiter ("*"), the pointer is moved next to the zero, which is also not the delimiter ("*"), and so the pointer is moved again until it lands on the delimiter "*". The row number twenty following the delimiter ("*") is selected and matched to content item "M_9—Granular Bedding to conform to Table in Section 02641 sieve design", which is added to the subset of information 12. Once row number 20 is selected, all instances of the row number are removed from the text string, so that the resulting text string will now read as follows:

AB*22*22*22*22*22*22*22*22*25*25*25*25*25
*25*30*31*32*38*41*43*44*44*44*44*44*44
*44*44*44*44*44*44*44*44*44*44*44*44*44
*47*48*49*53*59*60*63*64*65*71*72*76*77*80
*82*83 and the selection process begins anew for the next content item. This time around the random number is, for example, twelve, and so the pointer is moved from the start of the text string to a delimiter ("*"), and the next number to be selected is therefore twenty-two which matches up with content item "M_11—To install pipes in accordance with section 02641 3.3-3.6 must backfill with a minimum 900 mm of over compacted". Once row number 22 is selected, all instances of the row number are removed from the text string, so that the resulting text string will now read as follows:

AB*25*25*25*25*25*25*30*31*32*38*41*43*44*44
*44*44*44*44*44*44*44*44*44*44*44*44*44
*44*44*44*44*44*47*48*49*53*59*60*63*64*65
*71*72*76*77*80*82*83 and the selection process begins anew for the next content item, and so on.

Generation of the pre-selection list and its use in the subsequent selection of content items for inclusion in the subset of information 12 has been achieved with the following Microsoft® Excel®Visual Basic code:

```
 1: Sub GenerateMasterInspectionReport( )
 2: Dim IX As Integer
 3: Dim rgShow As Range
 4: Dim rgX As Range
 5: Dim strReducedPreSelectionList As String
 6: Dim strX As String
 7: Dim lgloopcounter As Long
 8: Dim lgitemcount As Long
 9: Dim lgCountOnReducedPreSelectionList As Long
10: Dim lgrow As Long
11: Dim lgLengthofList As Long
12: Dim lgX As Long
13: Dim srtStart As String
14: Dim strFormat As String
15: Dim dAlterFactor As Double
16: Dim strStart As String
17: Randomize
18: dAlterFactor = (Val(grgnContentItemsToCheck.Value) + 20) / grgnActiveItemCount '(Factor up)
19: Select Case fctRC(grgnItemList).r2
20:     Case Is < 100
21:         strStart = "AB"
22:         strFormat = "0#"
23:     Case Is < 1000
24:         strStart = "ABC"
25:         strFormat = "00#"
26:     Case Is < 10000
27:         strStart = "ABCD"
28:         strFormat = "000#"
29:     Case Is < 100000
30:         strStart = "ABCDE"
31:         strFormat = "0000#"
32:     Case Is < 1000000
33:         strStart = "ABCDEF"
34:         strFormat = "00000#"
35:     Case Is ≥ 1000000
36:         Exit Sub
37: End SelectgrgPriority.EntireRow.Hidden = True
38: Set rgShow = grgnHeadingRow
39: A:
40: strReducedPreSelectionList = strStart
41: lgitemcount = 0
42: lgCountOnReducedPreSelectionList = 0
43: For lgrow = 1 To grgPriority.Rows.Count
44:     Select Case grgPriority.Cells(lgrow, 1) >= 1 And Trim(grgDescription.Cells(lgrow, 1)) <> ""
45:         Case Is = True
46:             Select Case grgPriority.Cells(lgrow, 1)
```

```
47:        Case Is >= 100
48:            lgitemcount = lgitemcount + 1
49:            Set rgShow = Union(rgShow,
                   gwksNAMEData.Rows(grgPriority.Cells(lgrow, 1).row))
50:        Case Is < 100
51:            Select Case dAlterFactor
52:                Case Is >= 1
53:                    IX = grgPriority.Cells(lgrow, 1)
54:                Case Is < 0
55:                    GoTo exitSub
56:                Case Is < 1
57:                    IX = Int(Rnd + dAlterFactor *
                           grgPriority.Cells(lgrow, 1))
58:            End Select
59:            If IX = 0 Then GoTo NextItem
60:            lgCountOnReducedPreSelectionList =
                   lgCountOnReducedPreSelectionList + 1
61:            For lgX = 1 To IX strReducedPreSelectionList =
                   strReducedPreSelectionList & "*" &
                   Format(grgPriority.Cells(lgrow, 1).row, strFormat)
62:            Next lgX
63:            NextItem:
64:        End Select
65:        Case Is = False
66:    End Select
67: Next lgrow
68: If lgitemcount + lgCountOnReducedPreSelectionList <
        Val(grgnContentItemsToCheck.Value) Then GoTo A
69: End If
70: B:
71: Do Until lgitemcount >= Val(grgnContentItemsToCheck.Value)
72:     lgX = Int(Rnd( ) * (Len(strReducedPreSelectionList) − Len(strStart)) + 0.5)
73:     If lgX = 0 Then lgX = 1
74:     lgX = InStr(lgX, strReducedPreSelectionList, "*")
75:     strX = Mid(strReducedPreSelectionList, lgX + 1, Len(strFormat))
76:     Set rgX = gwksNAMEData.Rows(Val(strX))
77:     Set rgShow = Union(rgShow, rgX)
78:     lgitemcount = lgitemcount + 1
79:     StrReducedPreSelectionList = Replace(strReducedPreSelectionList, "*" & strX, "")
80:     lgloopcounter = lgloopcounter + 1
81:     If lgloopcounter > grgnContentItemsToCheck.Value Then GoTo Nextprocess
82: Loop
83: Nextprocess:
84:     rgShow.Rows.Hidden = False
85: C:
86: gwksNAMEData.Copy after:=gwksNAMEData
87: On Error Resume Next
88:     ActiveWorkbook.Sheets("NAME Subset of Information").Delete
89:     ActiveSheet.Name = "NAME Subset of Information "
90: On Error GoTo 0
91: Call subcleanupworksheet(ActiveSheet)
92: exitSub:
93:     End Sub
```

In the above code, lines 1 to 18 set up the variables. In line 17 the term "Randomize" resets the random number generator. In line 18, dAlterFactor is the reduction factor which is set to the sum of the number of content items to be included in the subset of information and the buffer of twenty, which sum is then divided by the total number of content items in the Excel® spreadsheet.

Lines 19 to 38 determine the form of the text string of the reduced pre-selection list. Line 19 determines the highest Excel® row number containing a content item. If the highest row number is less than one-hundred, the start sequence is set to "AB", and the row numbers are presented with two digits (i.e. 01-99). If the highest row number is less than one-thousand, the start sequence is set to "ABC", and the row numbers are presented with three digits (i.e. 001-999). If the highest row number is less than ten-thousand, the start sequence is set to "ABCD", and the row numbers are presented with four digits (i.e. 0001-9999). If the highest row number is less than one-hundred-thousand, the start sequence is set to "ABCDE", and the row numbers are presented with five digits (i.e. 00001-99999). If the highest row number is less than one-million, the start sequence is set to "ABCDEF", and the row numbers are presented with six digits (i.e. 000001-999999). If the highest row number is greater than or equal to one-million, the pre-selection list is too big, and so the program ends.

Line 37 hides all content items in the Excel® spreadsheet. Line 38 unhides the column headings in the Excel® spreadsheet.

Subroutine A containing lines 39 to 69 create the text string representing the reduced pre-selection list. Lines 40 to 42 set up variables. Lines 43 to 67 parse through the content items one by one and determine whether or not to include the row number associated with each content item, and if so, how many times each row number is to be included, based on the reduction factor "dAlterFactor". In particular, line 43 starts a loop which repeats itself for each row in the Excel® spreadsheet containing a relative priority associated with a content item. The first command in the loop at line 44 checks if the row has a relative priority greater than or equal to one, and a description in the description column. If this latter condition is not met, lines 65 and 66 skip the row and the loop repeats for the next row in the Excel® spreadsheet. If, on the other hand, a row satisfies the condition, lines 45 to 64 first check if the relative priority is a) greater than or equal to one-hundred, or b) less than one-hundred. If the relative priority is greater than one-hundred line 48 increases a counter which is checked to see if the predetermined number of content items selected for the subset of information has been reached, and line 49 unhides that particular row, since content items with a relative priority of one-hundred are automatically selected for inclusion in the subset of information.

If the relative priority is less than one-hundred, lines 50 to 64 proceed to determine whether to add the row number to the reduced pre-selection list and if so how many times. First lines 51 to 58 determine whether the reduction factor "dAlterFactor", calculated in line 18, has a value that is a) greater than or equal to one, b) less than zero, or c) less than one.

If dAlterFactor has a value that is one or greater, this means that the pre-selection list is small enough that it does not need to be reduced. Therefore, every row number will appear in the reduced pre-selection list the number of times equal to the relative priority associated with content item in that row. In particular, line 53 sets variable IX to equal to the relative priority in the row being considered. Next line 59 determines whether the value of IX is zero, in which case the row is skipped and the program moves to the next row. If IX is not zero, the program increases a counter "1gCountOnReducedPreSelectionList" which counts the number of row numbers being added to the reduced pre-selection list. Next lines 61 and 62 add the row number to the text string followed by an asterisk ("*") the number of times equal to the value of IX. Lines 63 and 64 then cause the program to move to the next row and the process repeats.

If dAlterFactor has a value that was less than zero, this reflects an error, and in that case lines 54 and 56 would exit the program.

If dAlterFactor has a value that is less than one, this means that the pre-selection list is large enough that it needs to be reduced. Therefore, lines 56 and 57 reduce the pre-selection list by setting variable IX equal to the sum of a random number (between 0 and 1), and the product of the reduction factor "dAlterFactor and the relative priority associated with the row number, wherein the variable IX is rounded down to an integer. Therefore, if for example, dAlterFactor is 0.1, then Excel® spreadsheet rows associated with a priority of one will have a 10% chance of being included in the reduced pre-selection list. As discussed above, lines 61 and 62 add the row number to the text string followed by an asterisk ("*") the number of times equal to the value of IX. Lines 63 and 64 then cause the program to move to the next row and the process repeats.

Line 68 checks to ensure that at the end of Subroutine A the number of rows representing content items in the pre-selection list not less than the predetermined number of content items desired for the subset of information, and if that is the case, the Subroutine repeats itself.

Subroutine B randomly selects rows, representing content items, from the text string, representing the reduced pre-selection list, for unhiding, and thus inclusion in the subset of information. In particular, lines 71 to 82 repeat until the 1gitemcount variable is greater than or equal to the ContentItemsToCheck variable which represents the predetermined number of items desired in the subset of information. As mentioned above, the value of the 1gitemcount variable may have been previously increased in line 48 if the set of information included any content items associated with a highest relative priority which in these examples is one-hundred.

Lines 72 to 75 randomly locate one row number in the text string. Lines 76 and 77 unhide the randomly located row number in the Excel® Spreadsheet. Line 78 increases the counter variable 1gitemcount by one. Line 79 deletes from the reduced pre-selection list all instances of the randomly located row number and its asterisks ("*"). Lines 80 and 81 provide a failsafe for exiting the loop of lines 71 to 82 in case the loop gets stuck in repeat. In effect, when the variable 1gloopcounter reaches a value greater than the predetermined number of content items desired in the subset of information, the program exits the loop by jumping to lines 83 and 84. The program also progresses to lines 83 and 84 when the loop ends normally. Lines 83 and 84 displays all rows in the Excel® spreadsheet which were unhidden by previously.

Subroutine C containing lines 85 to 93 generates a new Excel® spreadsheet containing only the subset of information which was unhidden by previously. In particular, line 86 creates a copy of the active Excel® spreadsheet. Lines 87 and 90 delete a previously generated Excel® spreadsheet named "NAME Subset of Information" if one exists, and renames the Excel® spreadsheet copy in this case as "NAME Subset of Information". Line 91 calls on a user prepared algorithm that cleans up the Excel® spreadsheet copy by removing all unnecessary rows and columns.

As will be appreciated by persons skilled in the art, in view of the above, the processor 20 of system 10 operates based on programming in the form of computer readable instructions for carrying out a method for selecting a subset of information to communicate to others from a set of information comprising a plurality of content items. Accordingly, the instructions may be stored on or carried by a computer readable medium now available, or those yet to be developed, including without limitation a memory stick, a CD, a DVD, a hard drive (internal or external), or on a remote server accessible to the processor via wired or wireless internet or intranet. Furthermore, as will be appreciated, the computer readable instructions may be located on a computer readable medium which is operable upon an interactive website that is accessible by a user.

Preferably, the system 10 is adapted to enable the user to communicate the subset of information 12 to a human network which may comprise for example a company work force. Accordingly, preferred embodiments of the present invention will have the processor 20 further configured to arrange the subset of information 12 in a form suitable for presentment to members of the human network prior to outputting the subset of information 12. Examples of forms of the subset of information 12 suitable for presentment to the members of the human network include checklists, publications (whether on print media or in a digital form), and presentations (whether on print media or in a digital form). Therefore, the output means is contemplated to include all devices capable of communicating the subset of information 12 to the members of the human network now available, or those yet to be developed, including without limitation a display 30, a printer 32, a projector, a wireless transmitter, and a computer readable medium, as mentioned above.

By way of example, FIG. 2 shows a representative checklist arranged and outputted by the processor 20 in accordance with an embodiment of the present invention. The checklist includes:

a. a space for the date of the checklist (e.g. "Date");
    b. a space for the project name (e.g. "3021—MDP");
    c. a subset of information containing 18 content items (e.g. "JR9", "JR37", . . . , "JR242");
    d. categories for the content items (e.g. "Category");
    e. descriptions for each of the content items (e.g. "Review Budget and Targets");

f. spaces for addition of comments or remarks (e.g. "Comments");
g. spaces to indicate the status of the content item, for example, whether the content item was checked and the result was satisfactory, not satisfactory, or whether the content item was not checked because it was not applicable, not relevant, or another reason (e.g. "Status");
h. the relative priorities associated with the content items (e.g. "100");
i. a section for comments (e.g. "Comments—Include any suggestions for improvement and/or any safety supplies that are needed on site"); and
j. spaces for signatures of one or more users processing the content items in the checklist (e.g. "Management Inspector Signature").

With the benefit of the present disclosure, persons skilled in the art will be able to come up with other arrangements for checklists to fulfill their needs. Accordingly, it is contemplated that the checklists may vary widely and may include more or less than is described above in association with the representative checklist in FIG. 2.

FIG. 3 shows a representative publication arranged and outputted by the processor 20 in accordance with another embodiment of the present invention. The publication includes:
a. a space for the date of the publication (e.g. "Date");
b. a subset of information containing 10 content items (e.g. "S151", "S159", . . . , "JS922");
c. categories for the content items (e.g. "Category");
d. descriptions for each of the content items (e.g. "Protecting The Public");
e. spaces for addition of comments, remarks, or highlighting important points for communicating to the others (e.g. "Comments");
f. spaces to indicate the status of whether the content item was communicated to others satisfactorily, not satisfactorily, or whether the content item was not communicated because it was not applicable, not relevant, or another reason (e.g. "Status");
g. the relative priorities associated with the content items (e.g. "5");
h. a section for comments (e.g. "Comments Follow up on this side of sheet");
i. spaces for signatures of one or more users presenting the publication (e.g. "Supervisor");
j. spaces for the names and signatures of the members of the human network to whom the subset of information was communicated (e.g. "Employees in Attendance").

With the benefit of this disclosure, persons skilled in the art will be able to come up with other arrangements for publications to fulfill their needs. Accordingly, it is contemplated that the publications may vary widely and may include more or less than is described above in association with the representative publication in FIG. 3.

FIG. 4 shows a slide from a representative presentation arranged and outputted by the processor 20 in accordance with another embodiment of the present invention. The slide depicts a table of contents of the subset of information 12 to be presented to the members of the human network either directly (i.e. live presentation), or indirectly (i.e. pre-recorded presentation). Optionally the processor 20 will include the ability to output in print form an attendance sheet for passing around at the end of the presentation for signature by the members of the human network that attended the presentation.

Furthermore, it is contemplated that the processor 20 may optionally be further configured to enable the user to input and store particulars of the members of the human network the subset of information in FIGS. 2 to 4 was communicated to, and to track the members.

Figure 5:
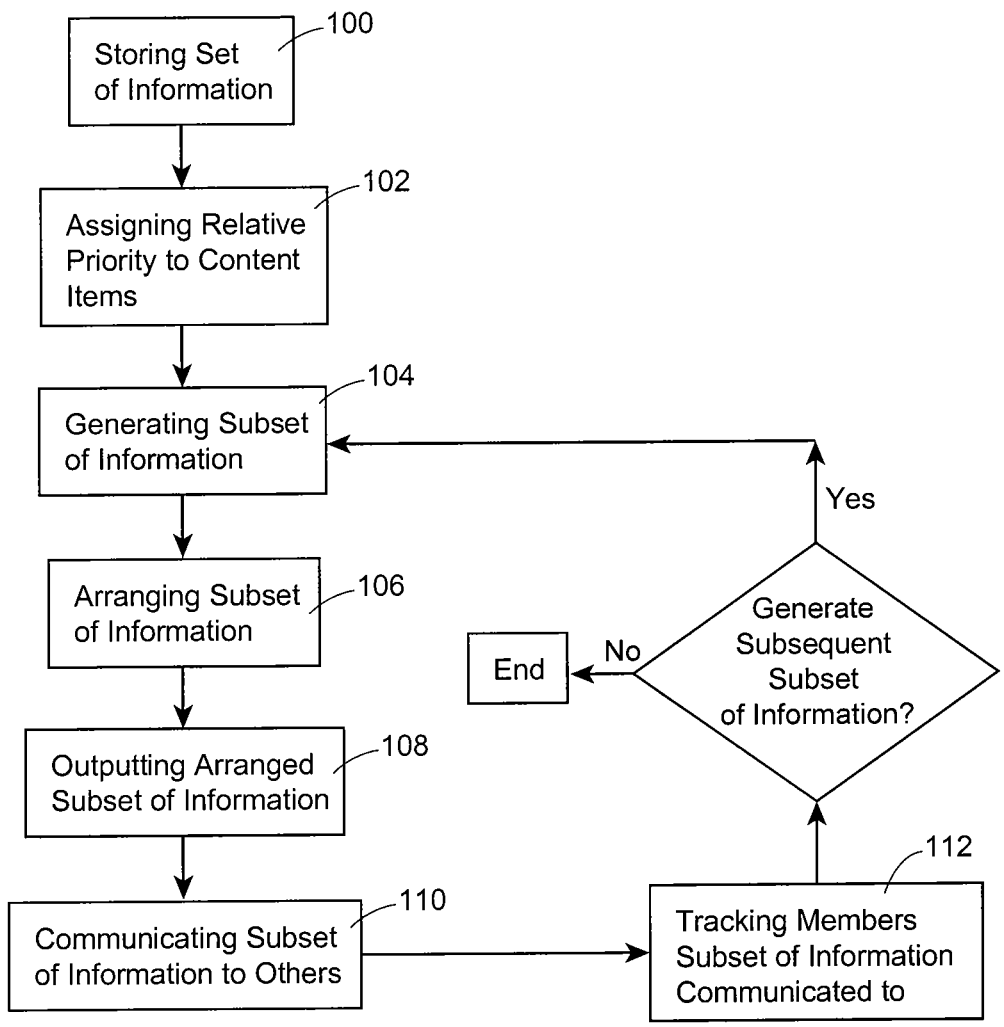
FIG. 5 is a flow diagram depicting steps in a method for selecting a subset of information to communicate to others from a set of information comprising a plurality of content items according to an embodiment of the present invention.

The above described system 10 is based on a method with broader applications for selecting a subset of information 12 to communicate to others from a set of information 14 comprising a plurality of content items, which is shown in FIG. 5. Preferably the method involves storing the set of information 14 in a user retrievable format, such as for example a database, or spreadsheet (step 100), assigning a relative priority to each of the plurality of content items (step 102), and automatically generating the subset of information 12 by selecting a predetermined number of the plurality of content items from the set of information based on the relative priorities of each of the plurality of content items (step 104). The predetermined number of content items selected for inclusion in the subset of information will preferably be less than the total number of the plurality of content items making up the set of information 14. Accordingly, the subset of information generated will be a prioritized subset of the set of information.

With respect to the relative priority assigning step 102, it is contemplated that at least one content item may be assigned its relative priority based on the content item's significance to a particular time of year (i.e. a particular week, month, quarter, season, etc.). It will be appreciated for example that a content item dealing with frostbite is more appropriate in southern Canada in the winter season, than at other times of the year. Accordingly, the relative priority of such a content item should be adjusted as its importance changes based on the current season. Preferably, however, the relative priorities of any of the content items may be changed by the user at any time, including the relative priority assigning step 102.

As mentioned above, the each of the relative priorities is a symbol or number reflecting the importance of the content item with which it is associated relative to other content items of the plurality of content items. Preferably the relative priorities will include one or more of a) a highest relative priority, b) a lowest relative priority, and c) intermediate relative priorities. Preferably, the relative priorities are numbers, particularly integers, ranging from 0 to 100. Thus 0 is the lowest relative priority, 100 is the highest relative priority, and 1 to 99 are intermediate relative priorities, as discussed above.

Subset generating step 104 preferably includes selecting all content items assigned the highest relative priority, with the proviso that the set of data contains no more content items assigned the highest relative priority than the predetermined number. However, it is contemplated that the predetermined number may be adjusted to be equal to or greater than the number of the content items assigned the highest relative priority, and the subset generating step 104 can include selecting all content items assigned the highest relative priority. However, it is also contemplated that the subset generating step 104 can include randomly selecting one or more of the content items assigned the highest relative priority, thereby removing the proviso that the set of data contains no more content items assigned the highest relative priority than the predetermined number.

The predetermined number, which is preferably adjustable by the user, may be determined taking into account any of a number of considerations, including the amount of space available on a sheet of print media, the amount of time available to a user to process the subset of information 12, or the maximum number of content items a user is able to process in a given period of time. Accordingly, the subset generating step 104 may include the steps of a) determining an amount of time available to a user to process the subset of information; b) determining an average time required to process one of the plurality of content items in the set of information; and c) adjusting the predetermined number by dividing the amount of time in step a) by the average time in step b). Alternately, the predetermined number may be set to a default value, and adjusted by the user in accordance with their needs.

Next, if the set of information 14 contains one or more content items assigned the lowest relative priority, in this case 0, the subset generating step includes the step of ignoring all content items assigned the lowest relative priority.

Next, if the set of information 14 contains one or more content items assigned intermediate priorities, the subset generating step 104 is configured to randomly select content items assigned the intermediate relative priorities. Preferably each of the intermediate priorities has an associated weight, the weights reflecting the relative importance of the content items to which they are assigned. For example, a content item assigned a first intermediate relative priority associated with a first weight has a better chance of random selection than a second content item assigned a second intermediate relative priority associated with a second weight, if the first weight is greater than the second weight.

After the subset of information 12 is automatically generated in the subset generating step 104, the subset of information 12 is arranged in step 106 in a form suitable for communicating the subset of information to others, for example, a human network, such as a company work force. Examples of forms of the subset of information 12 suitable for presentment to the members of the human network include checklists, publications (whether on print media or in a digital form), and presentations (whether on print media or in a digital form).

After being arranged in step 106, the subset of information 12 is outputted in step 108. Preferably, the outputting step 108 involves printing the arranged subset of information onto one or more sheets, displaying it on a display, or projecting it on to a screen.

Next the outputted subset of information is communicated to others, such as for example, a human network in step 110. As mentioned above, the human network may include, for example, members of a company work force. Accordingly, the communication step 110 may include providing publications of the arranged subset of information to the members of the human network. As another example, the communication step 110 may include presenting presentations of the arranged subset of information to the members of the human network, whether directly by way of, for example, a live presentation, or indirectly, by way of, for example, a pre-recorded presentation.

After communicating step 110, the method preferably includes a step 112 of tracking which members of the human network the subset of information has been communicated to. Tracking step 110 preferably includes obtaining signatures from the members of the human network the subset of information has been communicated to, and storing particulars of those members in the user retrievable format.

Following the tracking step 112 the method progresses to decision point 114 where the user must decide whether a subsequent subset of information is desired or not. If yes, the method returns to subset generating step 104, otherwise to end 116.

The subsequent subsets of information generated at step 104 preferably involve subsequent selections which select more of the subset of information not already selected in a previous selection step(s). As mentioned above, this may be accomplished by either (i) removing from the set of information 14 content items already selected for inclusion in a previous subset of information 12, or (ii) ignoring the content items already selected for inclusion in a previous subset of information 12 if selected again. In any event, under some circumstances it may be desired that some or all content items already selected for inclusion in a subset of information 12 remain in the set of information 14 and/or are not ignored so that they are still available for inclusion in a subsequent subset of information 12. For clarity, it is contemplated that if desired, specific content items (e.g. S0001), or those belonging to one of the three categories of relative priorities (e.g. highest relative priority, lowest relative priority, or intermediate relative priorities) may be set by the user to be available for inclusion in subsequent subsets of information, even if they have already been selected and included in a previous subset of information. By the same token specific content items (e.g. S0001), or those belonging to one of the three categories of relative priorities (e.g. highest relative priority, lowest relative priority, or intermediate relative priorities) may be set by the user to not be available for inclusion in subsequent subsets of information, if they have already been selected and included in a previous subset of information.

As mentioned above, it is contemplated that the set of information 14 may comprise any information that a user desires to communicate to others. Furthermore, as mentioned above, the content items will preferably be linked to additional information relating thereto. The additional information may be in the form of particulars relating to the content item or to a source of the particulars.

While reference has been made to various preferred embodiments of the invention other variations, implementations, modifications, alterations and embodiments are comprehended by the broad scope of the appended claims. Some of these have been discussed in detail in this specification and others will be apparent to those skilled in the art. Those of ordinary skill in the art having access to the teachings herein will recognize these additional variations, implementations, modifications, alterations and embodiments, all of which are within the scope of the present invention, which invention is limited only by the appended claims.

The embodiments of the invention in which an exclusive property or privilege is claimed are defined as follows:

1. A method for selecting a subset of information to communicate to others from a set of information comprising a plurality of content items, the method comprising the steps of:

storing said set of information in a user retrievable format;

assigning a relative priority to each of said plurality of content items, each of said relative priorities being a symbol or number selected from the group consisting of: a) a highest relative priority, b) a lowest relative priority, and c) intermediate relative priorities, wherein each of said intermediate relative priorities has an associated weight reflecting the relative importance of the content item with which it is associated relative to other content items of said plurality of content items; and automatically generating the subset of information by selecting a predetermined number of said plurality of content items from said set of information based on the relative priorities of each of the plurality of content items, the subset of information being free of all content items assigned said low relative priorities and including all of the content items assigned said high relative priorities and randomly selected content items assigned said intermediate relative priorities taking into account the weights associated with the intermediate relative priorities, such that a first content item assigned a first intermediate relative priority associated with a first weight has a better chance of random selection than a second content item assigned a second intermediate relative priority associated with a second weight, if the first weight is greater than the second weight;

wherein said predetermined number is less than the number of said plurality of content items; and wherein said subset of information is a prioritized subset of said set of information.

2. The method of claim 1, further including one or more subsequent steps of selecting a subset of information, wherein said subsequent selections select more of said set of information not already selected in a previous selection step.

3. The method of claim 1, further comprising the step of arranging the subset of information into a checklist.

4. The method of claim 3, further comprising the step of printing said checklist onto a sheet, or displaying said checklist on a display.

5. The method of claim 1, further comprising the step of communicating the subset of information to a human network.

6. The method of claim 5, wherein said step of communicating the subset of information to the human network comprises arranging the subset of information into a publication and providing the publication to members of the human network.

7. The method of claim 5, wherein said step of communicating the subset of information to the human network comprises arranging the subset of information into a presentation and presenting said presentation to members of said human network directly, or indirectly.

8. The method of claim 7, wherein the step of presenting said presentation to said members of said human network directly includes a live presentation.

9. The method of claim 7, wherein the step of presenting said presentation to said members of said human network indirectly includes a pre-recorded presentation.

10. The method of claim 5, further comprising the step of recording which members of the human network the subset of information has been communicated to.

11. The method of claim 10, wherein the recording step comprises obtaining signatures from the members of the human network the subset of information has been communicated to.

12. The method of claim 10, wherein the recording step comprises storing particulars of the members of the human network the subset of information has been communicated to in said user retrievable format.

13. The method of claim 5, wherein said human network comprises a company work force.

14. The method of claim 1, wherein said set of information comprises safety information, health information, quality control information, accounting information, training information, insurance information, business information, management information, operational control information, information technology information, telecommunications information, or audit information.

15. The method of claim 1, wherein said plurality of content items comprise topics relating to worker safety, worker health, worker training, insurance, business, management, operational control, information technology, telecommunications, or audits.

16. The method of claim 1, wherein said user retrievable format is a database.

17. The method of claim 1, wherein the set of data contains no more content items assigned said highest relative priority than said predetermined number.

18. The method of claim 1, wherein the step of generating the subset of information further includes adjusting the predetermined number of said plurality of content items to be equal to or greater than the number of said content items assigned said highest relative priority.

19. The method of claim 1, wherein the number is an integer.

20. The method of claim 19, wherein the integer is selected from the group of integers consisting of 0 to 100.

21. The method of claim 1, wherein said step of generating the subset of information includes the steps of:

a) determining an amount of time available to a user to process the subset of information;

determining an average time required to process one of said plurality of content items in said set of information; and c) adjusting said predetermined number by dividing the amount of time in step a) by the average time in step b).

22. The method of claim 1, wherein the step of assigning said relative priority to each of said plurality of content items includes assigning said relative priority to at least one content item based said at least one content item's significance to a particular time of year.

23. The method of claim 22, wherein the particular time of year is a week, month, quarter, or season.

24. The method of claim 1, further comprising the step of changing the relative priority assigned to at least one of said plurality of content items.

25. The method of claim 1, further comprising the step of linking at least one of said plurality of content items to additional information relating to said at least one of said plurality of content items.

26. The method of claim 25, wherein said additional information comprises particulars relating to said at least one of said plurality of content items, or a source of said particulars.

27. The method of claim 1 further comprising providing computer readable instructions on a computer readable medium for carrying out the steps.

28. The method of claim 27 wherein the computer readable medium is operable upon an interactive website that is accessible by a user.

29. A system for selecting a subset of information to communicate to others from a set of information comprising a plurality of content items, the system comprising:

a non-transitory, computer readable storing means configured to store said set of information in a computer readable format;

a processor having input means, said processor being in communication with the storing means, and being configured to a) enable a user to:

i) input said plurality of content items into said storing means, ii) assign a relative priority to each of said plurality of content items, each of said relative priorities being a symbol or number selected from the group consisting of: a) a highest relative priority, b) a lowest relative priority, and c) intermediate relative priorities, wherein each of said intermediate relative priorities has an associated weight reflecting the relative importance of the content item with which it is associated relative to other content items of said plurality of content items, and iii) input user commands; and b) automatically output the subset of information, in response to one of said user commands, by selecting a predetermined number of said plurality of content items from said set of information based on the relative priorities of each of the plurality of content items, the subset of information being free of all content items assigned said low relative priorities and including all of the content items assigned said high relative priorities and randomly selected content items assigned said intermediate relative priorities taking into account the weights associated with the intermediate relative priorities, such that a first content item assigned a first intermediate relative priority associated with a first weight has a better chance of random selection than a second content item assigned a second intermediate relative priority associated with a second weight, if the first weight is greater than the second weight;

wherein said predetermined number is less than the number of said plurality of content items, and wherein said subset of information is a prioritized subset of said set of information.

30. The system of claim 29, wherein said processor is further configured to automatically output subsequent subsets of information, in response to subsequent ones of said user commands, said subsequent subsets of information containing more of said set of information not already included in previous subsets of information.

31. The system of claim 29, wherein said storing means comprises said plurality of content items.

32. The system of claim 29, wherein said others comprises a human network.

33. The system of claim 32, wherein said human network comprises a company work force.

34. The system of claim 29, wherein said processor is further configured to arrange the subset of information into a checklist, a publication, or a presentation.

35. The system of claim 34, further comprising an output means for outputting said checklist, publication or presentation.

36. The system of claim 35, wherein said output means is a printer, a projector, a display, a wireless transmitter, a sound emitting device, or a computer readable medium.

37. The system of claim 29, wherein said set of information comprises safety information, health information, quality control information, accounting information, training information, insurance information, business information, management information, operational control information, information technology information, telecommunications information, or audit information.

38. The system of claim 29, wherein said plurality of content items comprise topics relating to worker safety, worker health, worker training, insurance, business, management, operational control, information technology, telecommunications, or audits.

39. The system of claim 29, wherein at least one of said plurality of content items is linked to additional information relating to said at least one of said plurality of content items.

40. The system of claim 39, wherein said additional information comprises particulars relating to said at least one of said plurality of content items, or a source of said particulars.

41. The system of claim 39, wherein said additional information is stored in said storing means in a computer readable format.

42. The system of claim 39, wherein said processor is configured to output the subset of information by:
a) determining an amount of time available to a user to process the subset of information;
b) determining an average time required to process one of said plurality of content items in said set of information; and
c) adjusting said predetermined number by dividing the amount of time in step a) by the average time in step b).

43. The system of claim 39, wherein the processor is configured to change the relative priority assigned to at least one content item based on the at least one content item's significance to a particular time of year.

44. The system of claim 43, wherein the particular time of year is a week, month, quarter, or season.

45. The system of claim 29, wherein the set of data contains no more content items assigned said highest relative priority than said predetermined number.

46. The system of claim 29, wherein the processor is configured to adjust the predetermined number of said plurality of content items to be equal to or greater than the number of said content items assigned said highest relative priority.

47. The system of claim 29, wherein the number is an integer.

48. The system of claim 47, wherein the integer is selected from the group of integers consisting of 0 to 100.

49. The system of claim 29, wherein the processor is configured to enable the user to change the relative priority of at least one of said plurality of content items.

50. The system of claim 49, wherein the processor is further configured to enable the user to input and store particulars of the members of the human network the subset of information was communicated to, and to track said members.

51. The system of claim 29, wherein said input means is a keyboard, mouse, keypad, wireless transmitter, computer readable medium, or a sound recognition device.

* * * * *

UNITED STATES PATENT AND TRADEMARK OFFICE
CERTIFICATE OF CORRECTION

| | | |
|---|---|---|
| PATENT NO. | : 8,676,813 B2 | Page 1 of 1 |
| APPLICATION NO. | : 13/232558 | |
| DATED | : March 18, 2014 | |
| INVENTOR(S) | : Denis J. Alarie | |

It is certified that error appears in the above-identified patent and that said Letters Patent is hereby corrected as shown below:

IN THE CLAIMS

Claim 1, column 24, line 59, delete "low relative priorities" and substitute therefore -- lowest relative priority --;

Claim 1, column 24, lines 60-61, delete "high relative priorities" and substitute therefore -- highest relative priority --;

Claim 29, column 26, line 68, delete "low relative priorities" and substitute therefore -- lowest relative priority --;

Claim 29, column 27, line 1, delete "high relative priorities" and substitute therefore -- highest relatively priority --.

Signed and Sealed this
Ninth Day of September, 2014

Michelle K. Lee
*Deputy Director of the United States Patent and Trademark Office*